(No Model.)
T. A. EDISON.
MANUFACTURE OF INCANDESCING ELECTRIC LAMPS.
No. 278,416. Patented May 29, 1883.
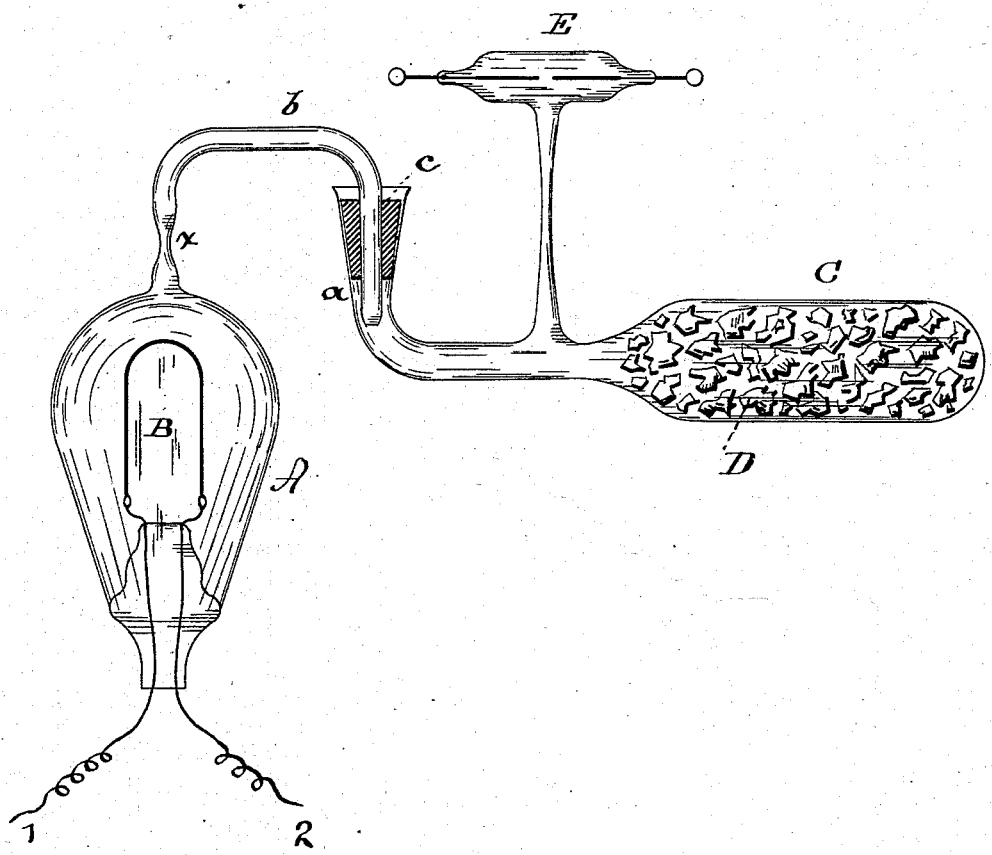
WITNESSES:
D. D. Mott
H. W. Seely
INVENTOR:
T. A. Edison
BY Rich.d N. Dyer,
ATTORNEY

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

MANUFACTURE OF INCANDESCING ELECTRIC LAMPS.

SPECIFICATION forming part of Letters Patent No. 278,416, dated May 29, 1883.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in the Manufacture of Incandescing Electric Lamps, (Case No. 400;) and I do hereby declare that the following is a full and exact description of the same, reference being had to the accompanying drawing, and to the letters of reference marked thereon.

The object I have in view is to produce a simple and efficient process and means for exhausting and completing incandescing electric lamps, so as to save the expense of the great number of Sprengel pumps which have to be used at present on account of the necessity of slowly treating the incandescing conductor of each lamp to drive the occluded gases therefrom.

The process consists, generally, in utilizing for this purpose an absorbent of gases contained in a chamber with which the lamp is connected, the incandescing conductor of the lamp being gradually heated by the passage of an electrical current therethrough after a sufficiently high vacuum has been obtained, and such incandescing conductor being finally brought up to a higher incandescence than that at which it is intended to be used commercially. The absorbent I prefer to use is charcoal, which is contained by a chamber adapted to be highly heated to drive the air out of the charcoal. The neck of this chamber is adapted for connection with the lamp by a rubber-packed joint, and is provided with a spark-gage to enable the condition of the vacuum to be ascertained. The lamp is first heated externally to drive as much air therefrom as possible, and it is then connected with the charcoal-chamber, which has been previously heated to a high degree, both the lamp and charcoal-chamber being hot at the time they are connected. The charcoal as it cools absorbs the air, and when a sufficiently high vacuum is obtained, which is ascertained by means of the spark-gage, the lamp is connected in an electric circuit and its incandescing conductor is slowly heated, throwing off the occluded gases, which are also absorbed by the charcoal. The conductor is finally brought up to higher incandescence than that at which it is intended to be used, so as to drive the air out of the clamps as far as possible. The lamp is then sealed off from the tube leading to the charcoal-chamber. The charcoal is again heated and the tube connected with another heated lamp, the operation being repeated, as before explained.

By this process mercury vacuum-pumps can be dispensed with, although in some instances a steam-operated vacuum-pump might be used with economy to partially exhaust the lamp before it is connected with the charcoal-chamber.

I may use also, in addition to the absorbent of gases, a suitable drying substance—such as phosphoric anhydride—which can be placed in the chamber with the charcoal and will absorb the aqueous vapor in the lamp. Previous to being connected with the chamber containing the gas-absorbent the lamp may be filled with an atmosphere of hydrochloric-acid gas, hydrobromic-acid gas, or ammoniacal gas, so as to displace as far as possible the air therein. The charcoal absorbs this gas without losing very greatly its capacity to absorb air, and a better vaccum may by its use be obtained.

The rubber-packed joint may also be dispensed with by extending the neck of the charcoal-chamber and sealing it directly to the globe of the lamp, or to a tube leading therefrom.

In my Patent No. 248,428 I describe the use of heated charcoal in connection with a mercury vacuum-pump for exhausting incandescing electric lamps; but in that instance the charcoal was used as auxiliary to the mercury-pump, while by my present invention I dispense altogether with such pumps.

The foregoing will be better understood from the drawing, which represents the principal parts of the apparatus used in carrying out the above-described process.

A is the globe of an incandescing electric lamp, having carbon filament B, to which are connected the leading-in wires 1 2. These are connected to form, with the carbon, a part of an electric circuit. C is a chamber, preferably of glass, containing charcoal D. The neck $a$ of this chamber is connected with the lamp by tube $b$ and rubber packing $c$. E is the spark-gage for ascertaining the condition of the vacuum. The lamp is sealed off at x.

What I claim is—

1. The process of exhausting an incandescing electric lamp, consisting in first removing the air from a chamber containing an absorbent of gases, connecting the lamp with such chamber, heating the incandescing conductor by an electric current when the vacuum becomes sufficiently high, and then sealing off the lamp from connection with said chamber, substantially as set forth.

2. The process of exhausting an incandescing electric lamp, consisting in heating the lamp and also a chamber containing an absorbent of gases, then connecting the two while hot, and finally heating the incandescing conductor by the passage of an electric current therethrough previous to sealing off the lamp, substantially as set forth.

3. In apparatus for producing vacua, the combination, with a chamber containing a gas-absorbing material, of means connected therewith for ascertaining the degree of exhaustion, substantially as set forth.

4. The process of producing a high vacuum, consisting in displacing the air in the chamber to be exhausted by another gas, (such as hydrochloric-acid gas, hydrobromic-acid gas, or ammonia-gas,) and then connecting such chamber with another chamber containing a substance which readily absorbs such gas, substantially as set forth.

This specification signed and witnessed this 28th day of February, 1882.

THOMAS A. EDISON.

Witnesses:
H. W. SEELY,
THOMAS JOHNSTON.